UNITED STATES PATENT OFFICE.

CARL HERMANN von HOESSLE, OF RADEBEUL, NEAR DRESDEN, REPUBLIC OF SAXONY, GERMANY.

ELECTROLYTIC MANUFACTURE OF COLLOIDAL METALS.

No Drawing.   Application filed August 31, 1921. Serial No. 497,455.

*To all whom it may concern:*

Be it known that I, CARL HERMANN VON HOESSLE, a subject of the Republic of Saxony, German Republic, and resident of 3 Sedanstrasse, Radebeul, near Dresden, Republic of Saxony, German Republic, have invented new and useful Improvement in the Electrolytic Manufacture of Colloidal Metals (for which I filed application in Germany, Feb. 16, 1919), of which the following is a specification.

The hydrosols of those metals which are readily oxidized when finely distributed in water, could not be prepared hitherto, for the reason that said metals, especially iron, nickel, lead, tin, aluminium, cannot be obtained by reducing their compounds in an aqueous solution. They are also oxidized at any attempt of atomizing them electrically under water.

A number of methods are known for preparing colloidal solutions of metals, but as most metals are more or less easily oxidized when finely distributed, the colloidal solutions prepared in this way generally contain metallic oxide. Bredig, Svedberg and others have described methods of electrically preparing colloidal solutions of metals, which may be called electrical atomizing. They formed an electric arc under water between metallic wire points and observed that the metal is disintegrated and remains suspended in the water in an extremely fine state of division. The solutions of most metals obtained in this manner are not stable but are partly oxidized.

Rebiere stated (Chemiker Zeitung 1912, page 1003) that even colloidal silver prepared in this way contains more or less oxide of silver. Ehrenhaft (Anzeiger der Wiener Akademie 39, page 241 to 243) disintegrated nickel, cobalt, aluminium, iron and bismuth by forming an electric arc between wires of these metals. But the coloured hydrosols obtained by this way are not metals as erroneously supposed, but colloidal oxides of metals.

According to the present invention the hydrosols of the metals named above, as silver, copper, iron, chromium, nickel, lead, mercury, aluminium, tin, bismuth, cobalt, uranium, tungsten, titan, molybdenum, thallium, vanadium, tantalum, can be obtained in a pure state. I have found that the formation of oxide is avoided by adding to the water, in which a small quantity of a reducing agent, for instance hydrosulphite of soda, brenzcatechin, pyrogallol, hydroxylamin, hydrazin or the like, has been dissolved, besides a necessary addition of a protective colloid, as gum arabic, albumose or the like. If the metals are electrically atomized by forming an electric arc between wires of them under such solutions to which a reducing agent is added, colloidal metals are obtained in a pure state. Sometimes the reducing agent has at the same time a protective power on colloidal substances. The solutions of the colloidal metal obtained in this manner can be purified. For this purpose the reducing agent is removed by dialyzing the solution or by precipitating the colloidal metal, washing and dissolving it again. Of course, the admission or influence of air must be carefully avoided, for the pure hydrosols of metals generally are readily oxidized.

The new hydrosols are of great medical value but may also be employed for various technical purposes.

*Example I.*

In a solution of 0.75 parts of sodium hydrosulphite and 1 part of gum arabic in 1000 parts of water copper is atomized by an electric current of 8 amp. and 20 volts. On dialyzing the solution, admission of air should well be excluded and a dark-red hydrosol of copper is obtained.

*Example II.*

In a solution of 0.75 parts of brenzacatechin and 1 part of albumen, albumose or other substances of high molecular weight in 1000 parts of water an electric arc is formed between wires of iron. Colloidal iron is formed, which is precipitated from the dark-red solution, by the addition of a small quantity of an acid. The precipitate is washed with water, air being well excluded, and dissolved again in pure water by adding alkali.

Example III.

Wires of nickel are electrically atomized in a solution of 1 part of albumose and 0.75 parts of sodium hydrosulphite in 1000 parts of water. A dark brown hydrosol is obtained which may be purified further on.

Example IV.

Aluminium is electrically atomized in an aqueous solution of an albumen derivative and a reducing agent. A brown hydrosol is obtained. (The "colloidal aluminium" known hitherto was only colloidal aluminium hydroxide.)

Example V.

Pieces of tungsten are atomized under water, while adding an albumen derivative and a reducing agent. A deep coloured hydrosol is obtained.

The invention is not confined to these examples and the quantities given therein.

What I claim is:

1. A process for the manufacture of colloidal metals which consists in disintegrating the metals in water while adding a reducing agent.

2. A process for the manufacture of colloidal metals which consists in disintegrating the metals in water, while adding a reducing agent and a protective colloid.

3. A process for the manufacture of colloidal metals which consists in disintegrating the metals in water, while adding a reducing agent, and dialyzing the solution.

4. A process for the manufacture of colloidal metals, which consists in disintegrating the metals in water, while adding a reducing agent and a protective colloid, and dialyzing the solution.

5. A process for the manufacture of colloidal metals which consists in disintegrating the metals in water, while adding a reducing agent, and precipitating the colloidal metal.

6. A process for the manufacture of colloidal metals which consists in disintegrating the metals in water, while adding a reducing agent and a protective colloid, and precipitating the colloidal metal.

7. A process for the manufacture of colloidal metals which consists in disintegrating the metals in water, while adding a reducing agent, precipitating the colloidal metal and dissolving it again in water, special care being taken to prevent admission of air.

8. A process for the manufacture of colloidal metals which consists in disintegrating the metals in water, while adding a reducing agent and a protective colloid, precipitating the colloidal metal and dissolving it again in water, special care being taken to prevent admission of air.

9. A process for the manufacture of colloidal metals oxidable when finely distributed in water, which consists in electrically atomizing them in water, while adding a reducing agent.

10. A process for the manufacture of colloidal metals oxidable when finely distributed in water, which consists in electrically atomizing them in water, while adding a reducing agent and a protective colloid.

11. A process for the manufacture of colloidal metals oxidable when finely distributed in water, which consists in electrically atomizing them in water while adding a reducing agent, and dialyzing the solution.

12. A process for the manufacture of colloidal metals oxidable when finely distributed in water, which consists in electrically atomizing them in water to which a reducing agent and a protective colloid is added, and dialyzing the solution.

13. A process for the manufacture of colloidal metals oxidable when finely distributed in water, which consists in electrically atomizing them in water to which a reducing agent is added, and precipitating the colloid metals.

14. A process for the manufacture of colloidal metals oxidable when finely distributed in water, which consists in electrically atomizing them in water while adding a reducing agent and a protective colloid, and precipitating the colloidal metals.

15. A process for the manufacture of colloidal metals oxidable when finely distributed in water, which consists in electrically atomizing them in water while adding a reducing agent, precipitating the colloidal metals, special care being taken to prevent admission of air.

16. A process for the manufacture of colloidal metals oxidable when finely distributed in water, which consists in electrically atomizing them in water while adding a reducing agent and protective colloid, precipitating the colloidal metals, special care being taken to prevent admission of air.

17. A process for the manufacture of colloidal metals oxidable when finely distributed in water, which consists in electrically atomizing them in water, while adding a reducing agent, precipitatng the colloidal metals and dissolving them again in water, special care being taken to prevent admission of air.

18. A process for the manufacture of colloidal metals oxidable when finely distributed in water, which consists in electrically atomizing them in water, while adding a reducing agent and protective colloid, precipitating the colloidal metals and dissolving them again in water, special care being taken to prevent admission of air.

19. As new articles of manufacture colloidal metals oxidable when finely distributed in water containing a reducing agent which prevents oxidation, which are readily oxidable by the influence of air, soluble in water, forming darkly coloured solutions.

20. As new articles of manufacture colloidal metals oxidable when finally distributed in water containing a reducing agent which prevents oxidation and a protective colloid, which are obtained by electrically atomizing these metals in water while adding the reducing agent.

21. As new articles of manufacture the aqueous solutions of colloidal metals oxidable when finely distributed in water containing a reducing agent which prevents oxidation, which are obtained by electrically atomizing these metals in water while adding the reducing and the protective colloid.

22. As new articles of manufacture the aqueous solutions of colloidal metals oxidable when finely distributed in water containing a reducing agent which prevents oxidation and a protective colloid, which are obtained by electrically atomizing these metals in water while adding the reducing agent, and dialyzing the solution.

In testimony, that I claim the foregoing as my invention, I have signed my name in presence of two witnesses, this eighth day of August, 1921.

CARL HERMANN von HOESSLE.

Witnesses:
WILHELM MEVES,
ALEXANDER FISCHER.